(12) United States Patent
Shapira et al.

(10) Patent No.: US 10,833,855 B2
(45) Date of Patent: Nov. 10, 2020

(54) ESTABLISHING SECURED COMMUNICATION OVER A WIRELESS CHANNEL

(71) Applicant: Celeno Communications (Israel) Ltd., Raanana (IL)

(72) Inventors: Nir Shapira, Raanana (IL); Shachar Hauzner, Tel Aviv (IL)

(73) Assignee: CELENO COMMUNICATIONS (ISRAEL) LTD., Raanana (IL)

( * ) Notice: Subject to any disclaimer, the term of this patent is extended or adjusted under 35 U.S.C. 154(b) by 179 days.

(21) Appl. No.: 16/084,566

(22) PCT Filed: Mar. 19, 2017

(86) PCT No.: PCT/IB2017/051586
§ 371 (c)(1),
(2) Date: Sep. 13, 2018

(87) PCT Pub. No.: WO2017/163160
PCT Pub. Date: Sep. 28, 2017

(65) Prior Publication Data
US 2019/0098497 A1 Mar. 28, 2019

(30) Foreign Application Priority Data
Mar. 23, 2016 (IL) .......................... 244737

(51) Int. Cl.
*H04L 9/08* (2006.01)
*H04W 12/04* (2009.01)
(Continued)

(52) U.S. Cl.
CPC ....... *H04L 9/0875* (2013.01); *H04W 12/0013* (2019.01); *H04W 12/0401* (2019.01); *H04L 2209/80* (2013.01); *H04W 84/12* (2013.01)

(58) Field of Classification Search
CPC . H04W 12/0401; H04W 12/02; H04W 12/04; H04W 12/0013; H04W 84/12; H04L 9/0875; H04L 2209/80
See application file for complete search history.

(56) References Cited

U.S. PATENT DOCUMENTS

2013/0163752 A1* 6/2013 Baek ................... H04L 63/16
380/44
2018/0219601 A1* 8/2018 Davydov ............. H04B 7/0626

FOREIGN PATENT DOCUMENTS

| CN | 104283677 A | 1/2015 |
|----|-------------|--------|
| CN | 102869013 B | 9/2015 |
| CN | 102869013 B * | 9/2015 |

OTHER PUBLICATIONS

International Application No. PCT/IB2017/051586, search report dated Jun. 26, 2017.
(Continued)

*Primary Examiner* — Nelson S. Giddins
(74) *Attorney, Agent, or Firm* — Kligler & Associates Patent Attorneys Ltd

(57) ABSTRACT

A wireless device (24) includes a modem (56) and processing circuitry (50, 52). The modem is configured to modulate signals for transmission over wireless channels, and demodulate signals received over the wireless channels. The processing circuitry is configured to receive a first frame from a second wireless device over a wireless channel via the modem, and transmit a second frame to the second wireless device via the modem over the wireless channel, to calculate a first Channel State Information (CSI) based on the first frame, to calculate a first normalized CSI by applying to the first CSI a normalization procedure, and generate, based on the first normalized CSI, a first key that due to the normalization procedure has an increased likelihood to match a second key generated in the second wireless
(Continued)

device based on the second frame, and to communicate securely with the second wireless device over the wireless channel using the first key.

22 Claims, 4 Drawing Sheets

(51) Int. Cl.
*H04W 12/00* (2009.01)
*H04W 84/12* (2009.01)

(56) References Cited

OTHER PUBLICATIONS

IEEE Std 802.11n™, "IEEE Standard for Information technology—Local and metropolitan area networks—Specific requirements—Part 11: Wireless LAN Medium Access Control (MAC) and Physical Layer (PHY) Specifications Amendment 5: Enhancements for Higher Throughput", 536 pages, year 2009.

IEEE Std 802.11ac™, "IEEE Standard for Information technology—Local and metropolitan area networks—Specific requirements—Part 11: Wireless LAN Medium Access Control (MAC) and Physical Layer (PHY) Specifications Amendment 4: Enhancements for Very High Throughput for Operation in Bands below 6 GHz", 425 pages, year 2013.

IEEE Std 802.11k™, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 1: Radio Resource Measurement of Wireless LANs", 244 pages, year 2008.

PHYLAWS—Project PHYLAWS (Id 317562) PHYsical LAyer Wireless Security, Deliverable 3.4—CIR Measurements and Modeling in ISM 2.4 GHz and 5 GHz bands, 82 pages, Version 2.0, Nov. 21, 2016.

PHYLAWS—Project PHYLAWS (Id 317562) PHYsical LAyer Wireless Security, Deliverable 5.3—WiFi test bed—Intermediate Report on WiFi Interceptor Experiments with the test bed, Results for Secret Key Generation, Version 1.0, 42 pages, Dec. 13, 2016.

\* cited by examiner

ESTABLISHING SECURED COMMUNICATION OVER A WIRELESS CHANNEL

CROSS-REFERENCE TO RELATED APPLICATIONS

This application claims priority from Israel Patent Application 244737, filed Mar. 23, 2016, whose disclosure is incorporated herein by reference.

TECHNICAL FIELD

Embodiments described herein relate generally to wireless communication, and particularly to methods and systems for establishing secured communication over a wireless channel.

BACKGROUND

A Wireless Local-Area Network (WLAN) typically comprises one or more Access Points (APs) that communicate with stations (STAs). WLAN communication protocols are specified, for example, in the IEEE 802.11 family of standards, such as in the 802.11n-2009 standard entitled "IEEE Standard for Information technology-Local and metropolitan area networks-Specific requirements-Part 11: Wireless LAN Medium Access Control (MAC) and Physical Layer (PHY) Specifications Amendment 5: Enhancements for Higher Throughput," 2009; in the 802.11ac-2013 standard entitled "IEEE Standard for Information technology-Local and metropolitan area networks-Specific requirements-Part 11: Wireless LAN Medium Access Control (MAC) and Physical Layer (PHY) Specifications Amendment 4: Enhancements for Very High Throughput for Operation in Bands below 6 GHz," 2013; and in the IEEE 802.11k-2008 standard entitled "IEEE Standard for Information technology Telecommunications and information exchange between systems—Local and metropolitan area networks—Specific requirements; Part 11: Wireless LAN Medium Access Control (MAC) and Physical Layer (PHY) Specifications; Amendment 1: Radio Resource Measurement of Wireless LANs," 2008, which are incorporated herein by reference. WLANs are also commonly referred to as Wi-Fi networks.

SUMMARY

An embodiment that is described herein provides a wireless device that includes a modem and processing circuitry. The modem is configured to modulate signals for transmission over wireless channels, and demodulate signals received over the wireless channels. The processing circuitry is configured to receive a first frame from a second wireless device over a wireless channel via the modem, and transmit a second frame to the second wireless device via the modem over the wireless channel, to calculate a first Channel State Information (CSI) based on the first frame, to calculate a first normalized CSI by applying to the first CSI a normalization procedure, and generate, based on the first normalized CSI, a first key that due to the normalization procedure has an increased likelihood to match a second key generated in the second wireless device based on the second frame, and to communicate securely with the second wireless device over the wireless channel using the first key.

In some embodiments, the processing circuitry is configured to apply the normalization procedure for reducing ambiguity in estimating the first CSI due to at least one of: (i) phase differences that exist between antennas of the wireless device, (ii) gain setting in reception paths of the antennas, and (iii) timing offset in estimating boundaries of received symbols. In other embodiments, the processing circuitry is configured to apply the normalization procedure to the first CSI, independently from an application of the normalization procedure to a second CSI generated in the second wireless device based on the second frame, and applying the normalization procedure reduces a difference between the first and second CSIs. In yet other embodiments, the processing circuitry is configured to calculate the first CSI by calculating multiple coefficient-vectors that each (i) corresponds to a respective pair of a receive antenna and a spatial stream, and (ii) includes multiple coefficients corresponding to multiple respective sub-carriers, and to apply the normalization procedure by normalizing separately each of the coefficient-vectors.

In an embodiment, the processing circuitry is configured to normalize a given coefficient-vector by dividing the given coefficient-vector by a respective average value calculated over selected coefficients of the given coefficient-vector. In another embodiment, the processing circuitry is configured to estimate, for one or more coefficient-vectors, a phase slope of a residual linear phase error across multiple sub-carriers, and to apply to the one or more coefficient-vectors linear phase compensation based on the estimated phase slope. In yet another embodiment, the processing circuitry is configured to exchange with the second wireless device average phase values calculated over coefficient-vectors of the first CSI and a second CSI generated by the second wireless device, to identify, based on the average phase values, that a difference in a given coefficient-vector between the first CSI and the second CSI exceeds a predefined difference threshold, and to exclude at least part of the given coefficient-vector from generating the first key.

In some embodiments, the processing circuitry is configured to exchange with the second wireless device differential phase values related to coefficient-vectors of the first CSI and a second CSI generated by the second wireless device, to select, based on the exchanged differential phase values, multiple sub-carriers over which to calculate respective phase-normalization factors for the coefficient-vectors, and to normalize the coefficient-vectors of the first CSI using the respective phase-normalization factors. In other embodiments, the processing circuitry is configured to transmit the second frame within a TX Opportunity (TXOP) during which the first frame was transmitted. In yet other embodiments, the processing circuitry is configured to initiate frame exchange by transmitting the second frame to the second wireless device and then receiving the first frame from the second wireless device, including transmitting the second frame only in response to validating that no CSI was sent over the wireless channel for at least a predefined time period longer than a coherency time of the wireless channel.

In an embodiment, the processing circuitry is configured to predefine a time period longer than a coherency time of the wireless channel, and to inhibit sending any CSI to the second wireless device for at least the predefined time period after receiving the first frame and after transmitting the second frame. In another embodiment, the processing circuitry is configured to assign a same set of antennas of the wireless device for receiving the first frame and for transmitting the second frame.

There is additionally provided, in accordance with an embodiment that is described herein, a method, including, in a first wireless device, receiving a first frame from a second wireless device over a wireless channel, and transmitting a second frame to the second wireless device over the wireless channel. A first Channel State Information (CSI) is calculated in the first wireless device based on the received first frame. A first normalized CSI is calculated in the first wireless device by applying to the first CSI a normalization procedure, and generating based on the first normalized CSI, a first key that due to the normalization procedure has an increased likelihood to match a second key generated in the second wireless device based on the second frame. Communicating securely with the second wireless device over the wireless channel is carried out using the first key.

These and other embodiments will be more fully understood from the following detailed description of the embodiments thereof, taken together with the drawings in which:

DETAILED DESCRIPTION OF EMBODIMENTS

Overview

Figure 1:
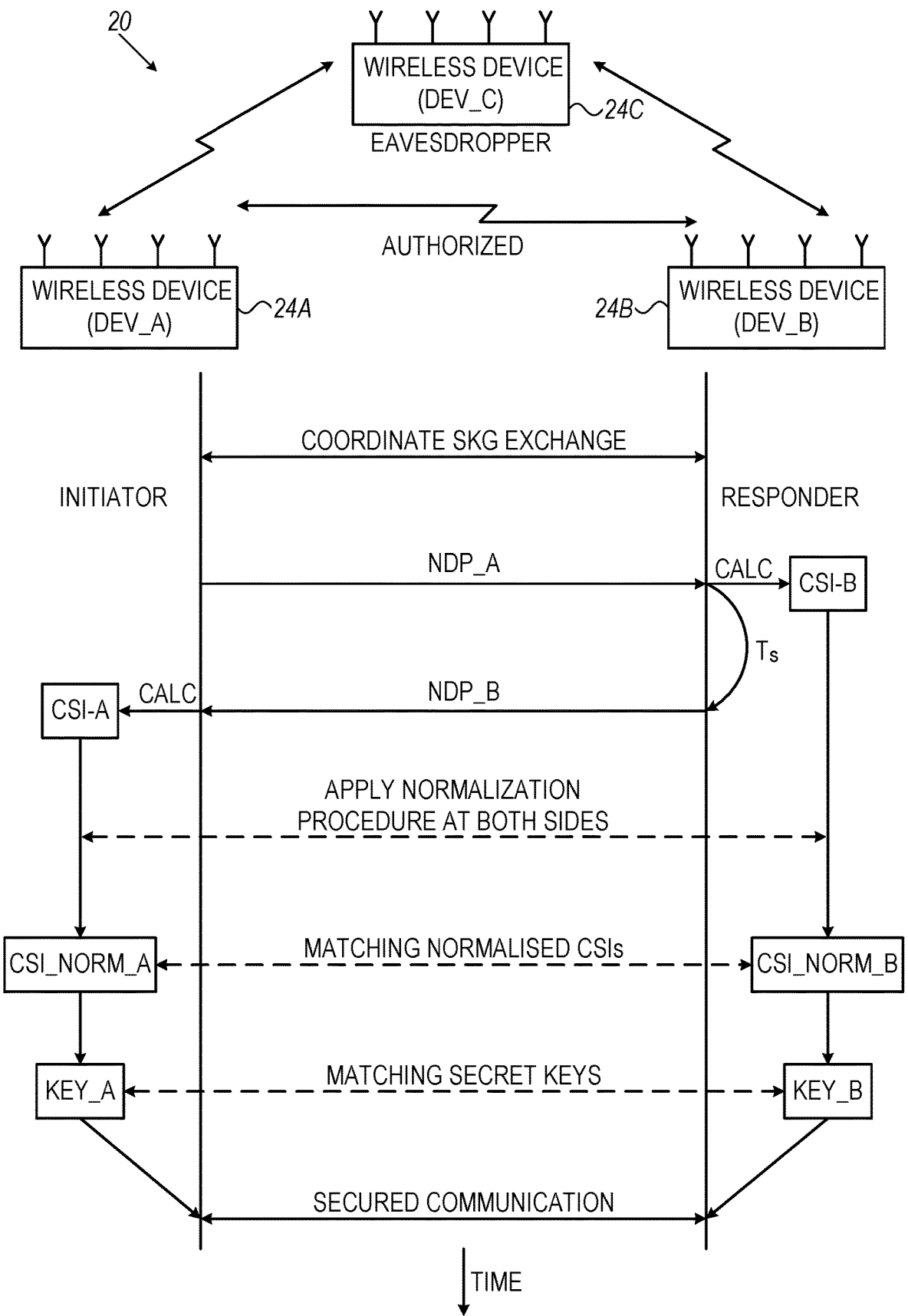
FIG. 1 is a diagram that schematically illustrates a wireless communication system, in which wireless devices establish secured communication, in accordance with an embodiment that is described herein.

Establishing secured communication between wireless devices is challenging, for example, because an unauthorized eavesdropper may intercept non-secured data exchanged for this purpose over the air, thus breaking the secrecy.

Embodiments that are described herein provide methods and systems for establishing secured communication over a wireless channel. The disclosed techniques rely on the uniqueness of the wireless channel shared by two devices communicating in a multipath-rich environment. In the disclosed embodiments, two wireless devices exploit channel information that is known exclusively to them to mutually generate secret keys. The secret keys may be used, for example, to encrypt messages exchanged between the wireless devices.

Each of the wireless devices estimates Channel State Information (CSI) corresponding to the wireless channel between the two devices, and normalizes the estimated CSI independently of the other device. The normalization process reduces phase, gain and timing ambiguities in estimating the CSI and therefore reduces discrepancies between the CSIs in the two devices so that secret keys calculated from the normalized CSIs are more likely to match for the purpose of secured communication. Since the normalization process is agreed upon in advance between the two devices, and assuming the wireless channel is approximately symmetrical, the keys generated by the devices based on the normalized CSIs will match each other, with high probability, even though each device generates its key independently of the other device.

Establishing a secured channel between wireless devices DEV_A and DEV_B should be done in a way that prevents any eavesdropper that intercepts messages exchanged between DEV_A and DEV_B from obtaining secret information. In the disclosed techniques, the two wireless devices exchange sounding frames for estimating the wireless channel between them, but do not transmit the estimated CSIs over the air, to maintain secrecy.

Note that an eavesdropper that captures the exchanged sounding frames cannot estimate the channel between DEV_A and DEV_B, because the channel between the eavesdropper and each of DEV_A and DEV_B is different from the channel between DEV_A and DEV_B. Therefore, the CSIs calculated by DEV_A and DEV_B for generating secret keys, remain known exclusively to them.

Because the channel between the two wireless devices is independent of the transmission direction, and assuming that the sounding frames were both transmitted within a sufficiently short interval, the CSI replicas in DEV_A and DEV_B are expected to be similar, but may still differ for various reasons.

For example, imperfect frame acquisition process at the device receiver may result in a gain and/or symbol-timing mismatch between DEV_A and DEV_B that causes mismatch between the CSI replicas. In addition, gain and phase differences in the transmit (TX) and receive (RX) paths in the receivers of DEV_A and DEV_B may also cause a mismatch between the respective CSIs. In the disclosed embodiments, a normalization procedure applied by each of the wireless devices to its CSI replica, independently of the other device, reduces possible discrepancies between the CSIs.

In some embodiments, the CSI comprises multiple coefficient-vectors, each comprising multiple complex-valued coefficients corresponding to respective multiple Orthogonal Frequency-Division Multiplexing (OFDM) sub-carriers. Each coefficient-vector is associated with a respective sub-channel between a receive antenna and a transmit antenna. In some embodiments, the wireless device normalizes each coefficient-vector separately by an average value of the respective coefficients, calculated over multiple sub-carriers.

A timing error in detecting the OFDM symbol boundaries typically results in a residual linear phase error across the sub-carriers. Different such timing errors between DEV_A and DEV_B may result in significant phase mismatch between the respective CSI replicas. In some embodiments, each of the wireless devices estimates a slope of the linear phase error, per coefficient-vector, and accordingly removes the linear phase error across the sub-carriers.

Methods for generating secret keys based on channel estimation are also referred to as "Secret Key Generation" or "SKG." The exchange of sounding frames for the purpose of secret key generation is also referred to herein as a "SKG exchange." In some embodiments, to ensure similar CSI replicas, a wireless device receiving a sounding frame in a SKG exchange responds by sending back to the other wireless device a sounding frame with minimal latency, e.g., within the same TX opportunity (TXOP).

In some embodiments, each of DEV_A and DEV_B refrains from sending CSI in a non-secured message (e.g., for establishing explicit beamforming operation) to the other device for a predefined period, before the SKG exchange starts and after the SKG exchange concludes. In an embodiment, this predefined period is longer than the channel coherency time, so that an eavesdropper that captures a CSI sent openly would not be able to deduce the wireless channel between DEV_A and DEV_B during the SKG exchange.

In some embodiments, each of DEV_A and DEV_B refrains from sending any CSI to the other device for a predefined period after receiving or transmitting a sounding frame in a SKG exchange. In addition, the wireless device sends a sounding frame as part of a SKG exchange only after validating that a predefined period has elapsed since the most recent transmission of a CSI over the wireless channel. In an embodiment, the predefined period is set longer than the channel coherency time.

In the disclosed techniques, to establish a secured channel, two wireless devices perform a dedicated sounding-frame exchange for estimating respective CSIs, and independently apply a CSI normalization procedure to reduce discrepancies between the CSIs to a level suitable for generating matching secret keys, which would not be possible without the disclosed techniques.

System Description

FIG. 1 is a diagram that schematically illustrates a wireless communication system 20, in which wireless devices 24A and 24B establish secured communication, in accordance with an embodiment that is described herein. FIG. 1 depicts wireless devices 24A, 24B and 24C, respectively denoted DEV_A, DEV_B and DEV_C. A practical communication system, however, may comprise any other suitable number of wireless devices.

Wireless communication system 20 may comprise, for example a Wireless Local-Area Network (WLAN), operating in accordance with the 802.11 specifications cited above. In wireless communication system 20, each of wireless devices 24 can be an Access Point (AP) or a station (STA). Alternatively, wireless communication system 20 and wireless devices 24 may operate in accordance with any other suitable wireless specifications and protocols.

Wireless devices DEV_A and DEV_B share a wireless channel having unique characteristics that can be kept inaccessible to other devices, and can therefore be used for generating secret keys. In the description that follows we describe methods for generating secret keys in which DEV_A and DEV_B exchange sounding frames for establishing secured communication without exposing the channel characteristics over the air.

In FIG. 1, wireless device DEV_C operates within reception range of DEV_A and DEV_B. DEV_C may be an eavesdropper that attempts to obtain secret information from messages communicated between DEV_A and DEV_B. Alternatively, DEV_C comprises a non-standard receiver that is especially adapted for eavesdropping to other connections.

In the present example, the wireless devices coordinate the start of a SKG exchange, e.g., by signaling to one another (or using unidirectional signaling) that a SKG is required. In addition, DEV_A and DEV_B may negotiate the assignment of one of them as initiator of the SKG exchange, and the other as a responder. Alternatively, one of DEV_A and DEV_B may be pre-assigned the role of the initiator and the other the role of the responder of the SKG exchange.

To estimate the wireless channel, DEV_A and DEV_B first exchange sounding frames denoted NDP_A and NDP_B, respectively. As an initiator, DEV_A sends a sounding frame NDP_A to DEV_B. To differentiate NDP_A from sounding frames that are used for other purposes such as beamforming, DEV_A may mark NDP_A with a unique SKG-tag. Alternatively, DEV_A sends an SKG-notification to DEV_B in a frame immediately preceding NDP_A. DEV_B recognizes the SKG-tag, or the SKG-notification, and responses by sending sounding frame NDP_B back to DEV_A.

Based on the received sounding frames, each of DEV_A and DEV_B independently generates a secret key. The generation of the secret keys includes the following main operations:

DEV_A calculates a CSI denoted CSI_A from sounding frame NDP_B, and DEV_B calculates a CSI denoted CSI_B from sounding frame NDP_A.

DEV_A calculates a normalized version of CSI_A denoted CSI_NORM_A, and DEV_B calculates a normalized version of CSI_B denoted CSI_NORM_B.

DEV_A generates from CSI NORMA a secret key denoted KEY_A, and DEV_B generates from CSI_NORM_B a secret key denoted KEY_B.

After generating secret keys KEY_A and KEY_B, wireless devices DEV_A and DEV_B can communicate securely with one another using the secret keys.

The sequence of operations described above, includes a CSI normalization stage, which assists DEV_A and DEV_B in generating matching secret keys even though DEV_A and DEV_B calculate the CSIs and respective keys independently. In some cases, to generate the matching keys, the devices may apply reconciliation techniques in addition to applying the CSI normalization.

In the context of the present patent application and in the claims, the term "matching keys" means that the secret keys can be used for applying matching cryptographic operations, e.g., encrypt using key_A at DEV_A and decrypt successfully using key_B at DEV_B. In some embodiments, e.g., when DEV_A and DEV_B communicate securely using symmetric ciphering, the matching keys are identical, i.e., the two secret keys comprise the same bit-string. Alternatively, DEV_A and DEV_B can also use asymmetric ciphering (or other cryptographic operations) in which case KEY_A and KEY_B comprise different bit-strings.

Note that if CSI replicas CSI_A and CSI_B differ significantly, the resulting secret keys KEY_A and KEY_B may fail to match. CSI Normalization is therefore required for reducing possible discrepancies between the CSI replicas to an acceptable level. In some embodiments, DEV_A and DEV_B both apply the same normalization procedure to their respective CSI replicas. As will be described in detail below, the CSI comprises multiple complex-valued coefficients, and the normalization procedure adjusts the amplitudes and phases of the CSI coefficients.

In the context of the present patent application and in the claims, the term "matching normalized CSIs" means that the normalized CSIs (e.g., CSI NORMA and CSI_NORM_B) are sufficiently similar for the purpose of generating matching secret keys (e.g., Key_A and Key_B).

In some embodiments, to exploit maximal channel information, DEV_A and DEV_B transmit the respective sounding frames NDP_A and NDP_B spanning the full dimensions of the device's antennas. For example, each device sends a sounding frame with a number of spatial streams that equals the number of transmit antennas. The device receiving the sounding frame estimates the full channel, i.e., all the sub-channels between its receive antennas and the transmitter's antennas.

The 802.11n and 802.11ac standards of the respective 802.11n-2009 and 802.11ac-2013 specifications cited above, supports a low-overhead channel-sounding frame, also referred to as Non Data Packet (NDP), which comprises only a preamble part and no data part.

Typically, to extract maximal CSI, a device would use an NDP that supports the highest possible bandwidth. For example, a device operating in accordance with the 802.11ac standard, and configured to a channel bandwidth of 80 MHz or 160 MHz, should use the NDP defined in this standard rather than the NDP defined in the 802.11n standard that supports channel bandwidth only up to 40 MHz. The preamble part contains training symbols that the receiver can use for CSI estimation. In alternative embodiments, instead of exchanging sounding frames, DEV_A and DEV_B may estimate the CSIs from data frames (having a preamble part plus a data part) spanning the full antenna dimensions.

As seen in FIG. 1, sounding frames NDP_A and NDP_B are not transmitted simultaneously. Since the wireless channel typically changes over time, which may cause a difference between the CSI replicas, the sounding frames should be transmitted with minimal time difference. In the present example, DEV_B should send NDP_B with minimal latency (denoted Ts in the figure) in response to receiving NDP_A. In an embodiment, Ts is configured shorter than the coherency time of the wireless channel, which is typically on the order of a few hundreds of milliseconds. In WiFi, the minimal Ts duration is determined by the Short Inter-Frame Space (SIFS) interval, i.e., 16 microseconds, as will be described below. Note that responding within SIFS interval typically requires low-level hardware support.

In some embodiments, DEV_B transmits NDP_B within the same TX opportunity (TXOP) interval during which DEV_A has transmitted NDP_A, as will be described below. The duration of the TXOP interval is typically between 5-10 milliseconds. Alternatively, DEV_B can response in another TXOP, in which case the device needs to re-gain air access, which may take an unpredictable amount of time.

It should be noted that in accordance with the 802.11 specifications cited above, a wireless device receiving a sounding frame is conventionally required to return a corresponding CSI feedback to the sending wireless device. In the disclosed embodiments, however, the responder does not send the CSI back, and therefore the CSIs that are used for generating the secret keys are never exposed over the air.

In addition, a sounding sequence in which a wireless device (e.g., DEV_B) receiving a sounding frame responses by immediately (i.e., within the SIFS interval) sending a sounding frame (back to DEV_A) is not supported within the 802.11 specifications. The sounding exchange in FIG. 1 is therefore unique for SKG in wireless environments.

In some embodiments, in addition to establishing secured communication, DEV_A and B DEV_B exchange sounding frames for other purposes such as for beamforming, in which a device receiving a sounding frame typically responses by sending back a respective CSI. If DEV_A or DEV_B would send a CSI shortly before or after sending the NDP_A or NDP_B sounding frames, this CSI could be highly correlated with CSI_A, CSI_B or both, and could therefore be used by an unauthorized entity (e.g., eavesdropper such as DEV_C) to deduce the secret key.

In an embodiment, DEV_A and DEV_B refrain from sending a CSI insecurely over the wireless channel for a predefined period before the transmission of NDP_A and after the transmission of NDP_B. In an embodiment, this predefined time period is set longer than the coherency time of the wireless channel.

In some embodiments, wireless device 24 has a different number (typically a larger number) of receive antennas than transmit antennas, or the device allocates different subsets of the entire antennas for transmit and receive operations. In such embodiments, the wireless device assigns the same set of antennas for both transmission and reception of sounding frames of the SKG exchange. For example, when the number of receive antennas is larger than the number of transmit antennas, wireless device 24 disables the excessive receive antennas during the SKG exchange.

Even though DEV_A and DEV_B perform the CSI normalization procedure independently, i.e., each device normalizes its own CSI replica without exchanging any data with the other device for this purpose, the resulting normalized CSIs are sufficiently similar in representing the reciprocal channel, and therefore can be used for generating matching secret keys.

Figure 2:
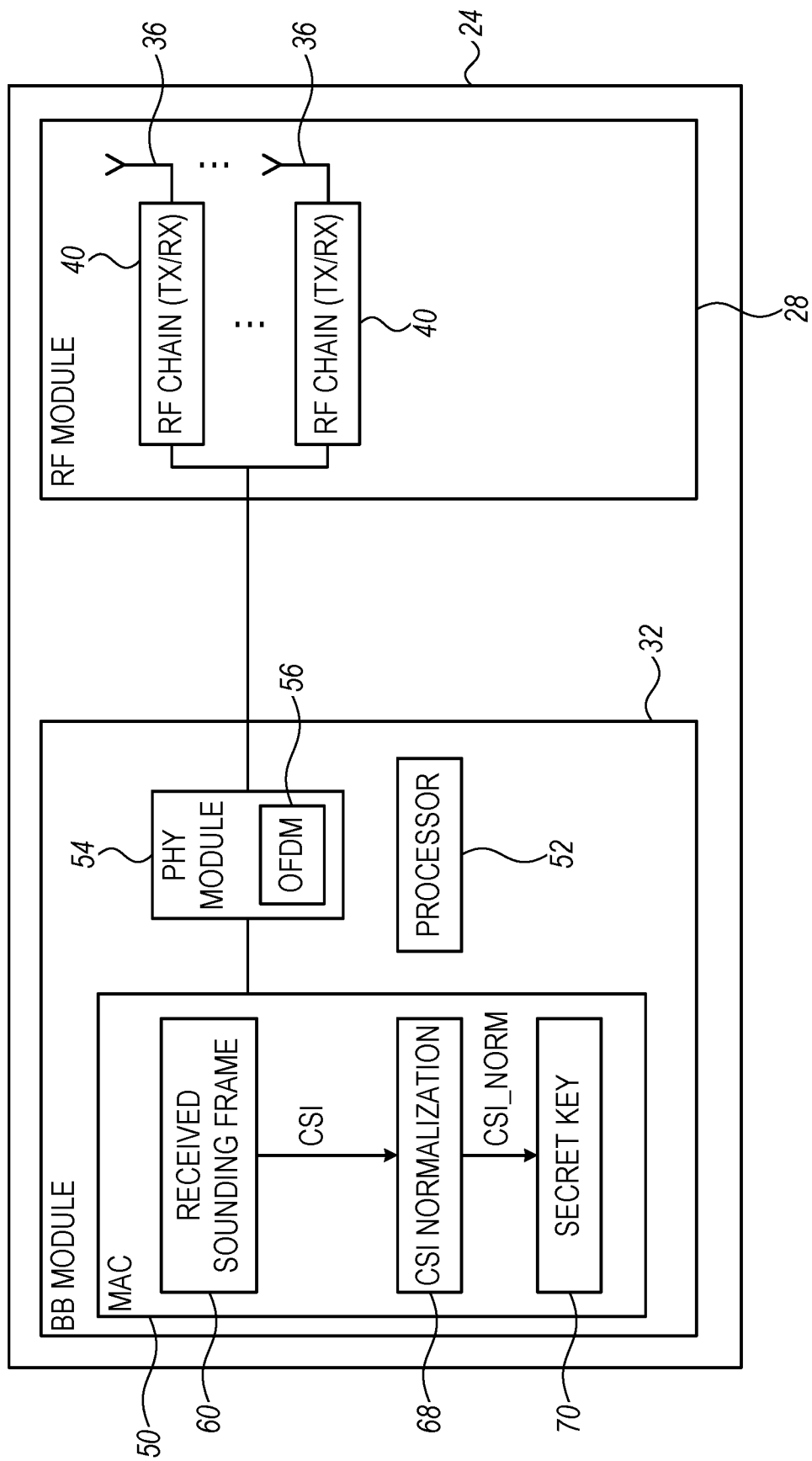
FIG. 2 is a block diagram that schematically describes a wireless device that supports Secret Key Generation (SKG), in accordance with an embodiment that is described herein.

FIG. 2 is a block diagram that schematically describes wireless device 24 that supports Secret Key Generation (SKG), in accordance with an embodiment that is described herein. The configuration of wireless device 24 of FIG. 2 may be used, for example, for implementing any of devices 24A-24C in wireless communication system 20 of FIG. 1.

Wireless device 24 comprises a Radio Frequency (RF) module 28 and a baseband (BB) module 32. In the present example, wireless device 24 comprises multiple antennas 36, and multiple respective bidirectional RF chains 40 that each comprises a TX chain for the transmit direction and a RX chain for the receive direction. In alternative embodiments, an antenna 36 may serve for transmission or reception and be coupled to a respective TX or RX chain. In some embodiments, RF chain 40 comprises a front-end (not shown) that switches the respective antenna between the TX and RX chains. The multiple antennas can be used, for example, for communicating with other wireless devices in a Multiple-In Multiple-Out (MIMO) configuration.

In the transmit direction, the TX part of RF chain 40 receives an analog baseband signal from BB module 32, up-converts the baseband signal to RF, and provides the RF signal to a respective antenna 36. In the receive direction, a RF signal is received via an antenna 36 and provided to the RX part of the respective RF chain, which down-converts the RF signal to baseband and provides the baseband signal to BB module 32.

The RF chains typically comprise configurable amplifiers and filters (not shown) that can be tuned, e.g., during frame acquisition, to properly set the gain, phase and bandwidth in the TX and RX paths.

Wireless device 24 may transmit one or more spatial streams via antennas 36 at desired respective gains and phases. The spatial streams may be provided by an external host computer (not shown), or generated internally within the wireless device. For example, wireless device 24 typically transmits a sounding frame spanning the antenna dimensions by transmitting a spatial stream per antenna.

BB module 32 in wireless device 24 comprises a Medium Access Control (MAC) module 50, a Physical-Layer (PHY) module 54 and a processor 52. Processor 52 carries out various tasks of the MAC module such as controlling and scheduling the transmissions via the PHY module.

In the transmit direction, the PHY module processes the spatial streams for transmission via transmit antennas 36. In some embodiments, the PHY module applies beamforming to the spatial streams, by setting certain gains and phases to the TX chains to spatially control the transmission. In the receive direction, the PHY module processes signals received via antennas 36 and extracts from the received signals information, such as data and sounding feedback information.

In the example of FIG. 2, PHY module 54 comprises an Orthogonal Frequency-Division Multiplexing (OFDM) modem 56. In the transmit direction, the PHY module maps bits in the spatial streams to symbols, e.g., in accordance with a Quadrature-Amplitude Modulation (QAM) scheme, and further maps the symbols to multiple OFDM subcarriers in the frequency domain. In the receive direction, the PHY module demodulates the received signal to recover the symbols.

In some embodiments, wireless device 24 receives from another wireless device a sounding frame 60 as part of a SKG exchange. The sounding frame contains known training data, which the receiver (e.g., MAC 50 and/or other elements of BB module 32) can use for estimating the channel between the transmitter and receiver antennas. BB module 32 calculates from sounding frame 60 a CSI corresponding to the channel between wireless device 24 and the device that has sent sounding frame 60.

In the description that follows we describe various tasks carried out by MAC 50. In alternative embodiments, these tasks can be carried out by one or more other elements of BB module 32 instead of or in addition to MAC 50.

The CSI typically comprises multiple channel matrix elements that each characterizes gain and phase attributes representing a channel response function between a pair of transmit antenna and a receive antenna. Each channel matrix element is characterized across multiple complex-valued coefficients, corresponding to the respective OFDM sub-carriers. A channel matrix element, or a pair of receive antenna and a spatial stream, is associated with a "coefficient-vector" comprising the respective CSI coefficients. Assuming that the CSI is based on $N_{RX}$ receive antennas and $N_{TX}$ transmit antennas, the CSI can be represented by a matrix comprising $N_{RX} \cdot N_{TX}$ coefficient-vectors, that each comprises multiple CSI coefficients, i.e., one coefficient per an OFDM sub-carrier.

In some embodiments, MAC 50 calculates from the CSI a normalized CSI (denoted CSI_NORM) by applying to the CSI calculated from sounding frame 60 a suitable CSI normalization procedure 68. MAC 50 then calculates from CSI_NORM a secret key 70. An example method for CSI normalization will be described in detail below.

In some embodiments, secret key 70 comprises an encryption key, decryption key or both, in accordance with any suitable encryption method. The length of secret key 70 is typically on the order of several tens of bits, e.g., a 128-bit or 256-bit key. In such embodiments, wireless device 24 communicates securely with the peer device by using secret key 70 to encrypt messages sent to the peer device and/or decrypt encrypted messages received from the peer device. Alternatively or additionally, secret key 70 can be used in other secured communication methods, such as, for example, in authentication or digital signing.

The configurations of wireless communication system 20 and wireless device 24 shown in FIGS. 1 and 2 are example configurations, which are chosen purely for the sake of conceptual clarity. In alternative embodiments, any other suitable communication system and wireless device configurations can be used.

The division of functions among RF module 28 and BB module 32 may differ from the division shown in FIG. 1. The RF module and BB module may be integrated in a single device (e.g., on a single silicon die) or implemented in separate devices (e.g., separate silicon dies). Further alternatively, the functionality of the front-ends may be implemented in the RF module within or outside RF chains 40, or wireless device 24 may be implemented without an RF module.

The different elements of wireless device 24 may be implemented using suitable hardware, such as in one or more RFICs, Application-Specific Integrated Circuits (ASICs) or Field-Programmable Gate Arrays (FPGAs). In some embodiments, some elements of wireless device 24, e.g., processor 52, can be implemented using software, or using a combination of hardware and software elements. Elements of wireless device 24 that are not mandatory for understanding of the disclosed techniques have been omitted from the figure for the sake of clarity.

In some embodiments, processor 52 is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory. This processor may be internal or external to the BB module.

In the context of the present patent application and in the claims, the elements of BB module 32 excluding PHY module 54 are referred to collectively as "processing circuitry." In the example of FIG. 2, the processing circuitry comprises the elements of MAC module 50 and processor 52.

Figure 3:
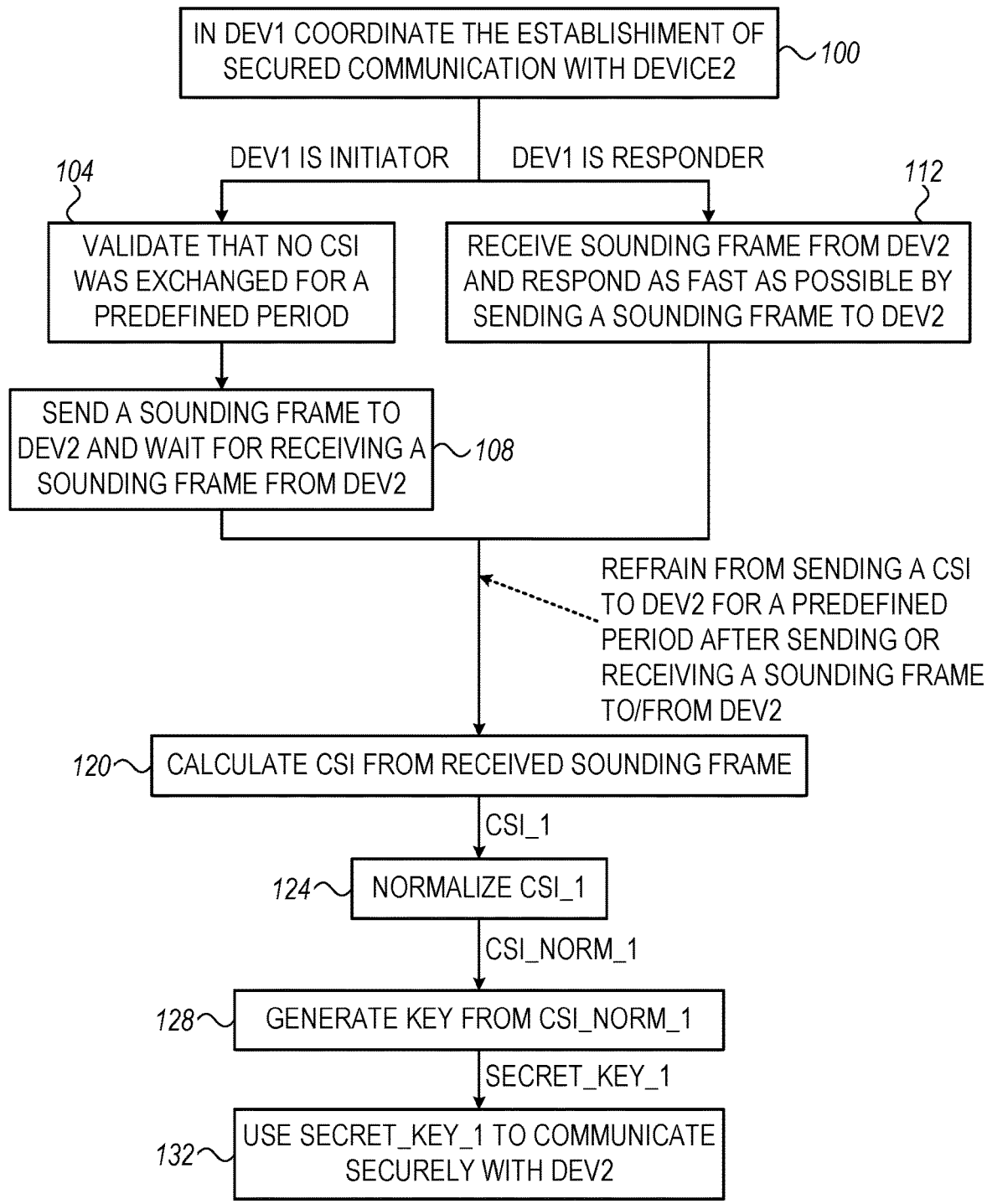
FIG. 3 is a flow chart that schematically illustrates a method for establishing secured communication between wireless devices, in accordance with an embodiment that is described herein.

Methods for Secret Key Generation for Secure Communication Between Wireless Devices FIG. 3 is a flow chart that schematically illustrates a method for establishing secured communication between wireless devices, in accordance with an embodiment that is described herein. The method is described as being executed by processor 52 of BB module 32 of a wireless device DEV1, which is required to communicate securely with a wireless device DEV2. DEV1 and DEV2 may comprise, for example, wireless device 24 of FIGS. 1 and 2 above. In the description that follows, a sounding frame transmitted within a SKG exchange is also referred to as a "SKG sounding frame."

At a coordination step 100, processor 52 of DEV1 coordinates the establishment of secured communication with DEV2. At step 100, the processor performs a handshake sequence with DEV2 in which at least one of DEV1 and DEV2 indicates to the other device the initiation of the SKG exchange. Additionally at step 100, the processor may negotiate with DEV2 whether DEV1 is the initiator or responder of the SKG exchange.

If at step 100, DEV1 was assigned the initiator, the processor proceeds to a validation step 104, to validate that no CSI was exchanged with DEV2 (e.g., for sounding calibration) for a predefined period, before sending a sounding frame for SKG. For example, the processor may validate that a period longer than the coherency time of the channel has elapsed since DEV1 has sent a CSI to DEV2 or received a CSI from DEV2, therefore ensuring that an unauthorized eavesdropper that may intercept the sounding frame of the SKG would not be able to deduce the secret key.

At a sounding exchange step 108, only after the predefined period has elapsed, the processor sends a sounding frame to DEV2, and waits to receive a sounding frame from DEV2.

If at step 100, DEV1 was assigned as a responder, the processor proceeds to a responder exchange step 112, in which the processor waits to receive a sounding frame from DEV2 (which was assigned the initiator), and in response to receiving the sounding frame sends a sounding frame back to DEV2.

In some embodiments, when DEV1 is a responder, the processor sends the sounding frame to DEV2 within the same TX opportunity (TXOP) interval during which the sounding frame received at step 112 was transmitted by DEV2. In accordance with the 802.11 specifications cited above, responding within the same TXOP guaranties a separation interval between the SKG sounding frames of Short Inter-Frame Space (SIFS), i.e., typically 16 microseconds. In some embodiments, the exchange of the sounding frames within the same TXOP is handled by a Low-level MAC layer (LMAC) of MAC 50, because at higher layers the responder side needs to contend for the air medium, a process that may last on the order of several milliseconds or more, which is much longer than suitable for SKG.

In some embodiments, the processor refrains from sending a CSI to DEV2 (e.g., related to beamforming calibration) for at least a predefined period after receiving the SKG sounding frame from DEV2, after sending an SKG sounding frame to DEV2, or both. The predefined period may be set to the channel coherency time or longer, to prevent an unauthorized entity (e.g., an eavesdropper) from intercepting the CSI and deduce the secret key.

In an embodiment, the processor predefines a time period longer than a coherency time of the wireless channel, and inhibits sending any CSI to DEV2, for at least the predefined time period, after receiving a SKG sounding frame from DEV2 (at step 112) and after transmitting a SKG sounding frame to DEV2 (at step 108 or 112).

Following step 108 or 112, the processor proceeds to a CSI calculation step 120, in which the processor calculates a CSI denoted CSI_1 based on the sounding frame received from DEV2. The processor may calculate the CSI using any suitable method. In an example embodiment, the processor calculates CSI_1 using a method that is conventionally used for CSI estimation during beamforming calibration, or for the reception of frames of any suitable type.

At a normalization step 124, the processor applies to CSI_1 a normalization procedure, resulting in a normalized CSI denoted CSI_NORM_1. An example normalization procedure is described in detail further below.

At a key-generation step 128, the processor generates a secret key from the normalized CSI. The processor can generate the secret key using any suitable method. For example, in some embodiments, the processor calculates the secret key by quantizing the coefficients of CSI_NORM_1.

At a secure communication step 132, the processor uses the secret key generated at step 128 to communicate securely with DEV2, which due to the normalization procedure has a secret key that matches the key of step 128.

Methods for CSI Normalization

Figure 4:
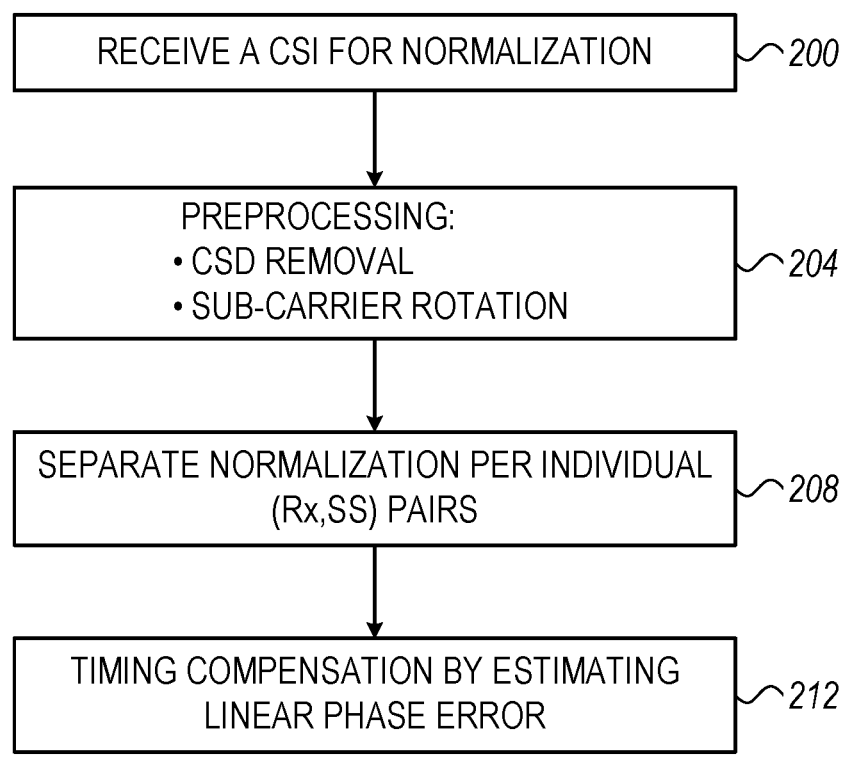
FIG. 4 is a flow chart that schematically illustrates a method for Channel State Information (CSI) normalization for SKG, in accordance with an embodiment that is described herein.

FIG. 4 is a flow chart that schematically illustrates a method for Channel State Information (CSI) normalization for SKG, in accordance with an embodiment that is described herein. The method can be executed, for example, by wireless device 24 of FIG. 2, e.g., devices 24A and 24B (denoted DEV_A and DEV_B respectively) of FIG. 1. The method can be used in implementing CSI normalization 68 of FIG. 2 and/or normalization step 124 of FIG. 3.

As noted above, the CSIs calculated by DEV_A and DEV_B are based on sounding frames that were captured at different times. Even if we assume that the channel does not change significantly between these sounding frames, the respective CSIs may differ due to imperfect frame acquisition process performed in the wireless devices as described herein.

Wireless device 24 typically performs a frame acquisition process to the sounding frame (or a data frame) received, which typically includes processing tasks such as: adjustment of the gains in the RF chains using Automatic Gain Control (AGC), estimation of timing and frequency offsets in the received signal, and determining the time boundaries of the OFDM symbols. Since the frame acquisition process is performed in each device independently, and is prone to estimation errors, the CSIs estimated based on the received sounding frames typically differ from one another. The differences between the CSIs may be even pronounced when the wireless devices use chipsets provided by different respective Wi-Fi chipset vendors.

Note that although the estimation errors in the frame acquisition process may be tolerable for signal reception purposes, the resulting differences between the CSIs are typically intolerable for the purpose of SKG. For example, since in accordance with the 802.11 specifications, the OFDM symbols are separated by a guard interval, the receiver can tolerate timing errors in determining the symbol boundaries up to the guard interval length, i.e., 0.8 microseconds. A frame that was captured with a symbol timing error within the guard interval introduces, however, a linear phase error in the CSI coefficients across the OFDM sub-carriers. Therefore, calculating the CSIs from frames that were captured with different respective symbol timing errors (within the 0.8 microseconds guard interval) may result in significant phase errors between coefficients in the respective CSIs, which are intolerable for SKG.

The method of FIG. 4 is described as being executed by processor 52 of DEV1. The method begins with the processor receiving a CSI for normalization. At a preprocessing step 204, the processor preprocesses the CSI coefficients by performing Cyclic Shift Diversity (CSD) removal and sub-carrier rotation. The preprocessing at step 204 is required to remove transformation on the channel that the transmitting device applies in accordance with the 802.11 specifications cited above, in order to get the actual air channel estimate.

In some embodiments, the wireless devices apply a direct mapping between spatial streams and TX antennas, i.e., a single spatial stream per TX antenna. Alternatively, both devices use the same spatial expansion/mapping matrix, which is not necessarily a direct mapping. Further alternatively, the wireless devices use different respective expansion/mapping matrices, and each wireless device has knowledge of the expansion/mapping matrix used by the other wireless device.

The CSI can be represented by a matrix comprising $N_{RX}$-by-$N_{SS}$ vectors that each comprises $N_{SC}$ complex-valued coefficients. $N_{RX}$ denotes the number of receive antennas, $N_{SS}$ denotes the number of spatial streams, and $N_{SC}$ denotes the number of OFDM sub-carriers. For example, for wireless devices operating in accordance with the 802.11 specifications, the number of receive antennas and spatial streams may be $N_{RX}=4$ and $N_{SS}=4$, respectively. In addition, to communicate over a 80 MHz channel, the devices use a 256-bin FFT. In a Very High Throughput (VHT) configuration (in accordance with the 802.11ac standard) the number of OFDM data sub-carriers is 234.

Let $Rx=0 \ldots N_{RX}-1$ denote a receive antenna index, $SS=0 \ldots N_{SS}-1$ denote a spatial stream index, and $H^{Rx,SS}$ denote the coefficient-vector corresponding to the sub-channel between receive antenna Rx and the transmit antenna assigned to spatial stream SS, or to an "effective antenna"

when using an expansion/mapping other than the direct mapping. The CSD removal operation at step 204 is given by:

$$\tilde{h}_n^{Rx,SS} = h_n^{Rs,SS} \cdot \exp\left[\frac{j2\pi \cdot CS_{SS} \cdot \left(n - \frac{N_{SC}}{2}\right)}{64}\right] \quad \text{Equation 1}$$

wherein in Equation 1, $h_n^{Rx,SS}$ and $\tilde{h}_n^{Rx,SS}$ denote the coefficient corresponding to the $n^{th}$ sub-carrier of $H^{Rx,SS}$ before and after the CSD removal, and $CS_{SS}$ denotes the cyclic shift corresponding to special stream SS.

Further at step 204, the processor applies sub-carrier rotations to the CSI coefficients as given by:

$$\hat{h}_n^{Rx,SS} = \begin{cases} \tilde{h}_n^{Rx,SS} & \text{if } n < 64 \\ \alpha \cdot \tilde{h}_n^{Rx,SS} & \text{otherwise} \end{cases} \quad \text{Equation 2}$$

wherein in Equation 2, $\alpha$ is a constant whose value depends on the underlying bandwidth used. For example, for a 80 MHz bandwidth configuration $\alpha=-1$, and for a 40 MHz bandwidth configuration $\alpha=j$ (i.e., a unity complex value). For 160 MHZ and (80+80)MHz configurations, Equation 2 is applied separately to each of the 80 MHz halves of the bandwidth.

At a normalization step 208, the processor normalizes the CSI coefficients, separately for each coefficient-vector or (Rx,SS) pair, by a normalization factor NF(Rx,SS) as given by:

$$\tilde{h}_n^{Rx,SS} = \frac{\hat{h}_n^{Rx,SS}}{NF(Rx, SS)} \quad \text{Equation 3}$$

The normalization factor in denominator of Equation 3 can be calculated using any suitable method. In some embodiments, the normalization factor is calculated by averaging over multiple CSI coefficients, e.g., as given by:

$$NF(Rx, SS) = \frac{1}{N} \sum_{x_k \in D_{SC}} \hat{h}_n^{Rx,SS} \quad \text{Equation 4}$$

In Equation 4, $D_{SC}$ denotes a subgroup of N data sub-carriers selected from among the $N_{SC}$ OFDM sub-carriers, and $x_k$ denotes the index of the $k^{th}$ data sub-carrier, wherein $k=0 \ldots N-1$ and $x_k$ gets values in the range $0 \ldots N_{SC}-1$.

The normalization factor in Equation 4 is calculated only over data sub-carriers because in accordance with the 802.11 specifications, pilot sub-carriers are transmitted in Very High Throughput (VHT) frames only for the first spatial stream in the frame. The normalization in Equation 4 above removes from the CSI the effects of phase and gain mismatches between the TX and RX chains in the RF chains.

In alternative embodiments, instead of calculating a simple average as in Equation 4, NF(Rx,SS) is calculated as a weighted average, e.g., giving higher weights to CSI coefficients whose respective sub-carriers have higher Signal to Noise Ratio (SNR) values.

Further alternatively, the magnitude and phase parts of the CSI are averaged separately:

$$NF_M(Rx, SS) = \frac{1}{N} \sum_{x_k \in D_{SC}} |\hat{h}_{x_k}^{Rx,SS}| \quad \text{Equation 5}$$

$$NF_P(Rx, SS) = \frac{1}{N} \sum_{x_k \in D_{SC}} \text{Phase}(\hat{h}_{x_k}^{Rx,SS}) \quad \text{Equation 6}$$

and Equation 3 is replaced by:

$$\tilde{h}_n^{Rx,SS} = \frac{\hat{h}_n^{Rx,SS}}{NF_M(Rx, SS)} \exp[-j \cdot NF_P(Rx, SS)] \quad \text{Equation 7}$$

In Equation 6, the phase(·) operator extracts an unwrapped phase component of the coefficient. Alternatively, Equation 7 can be used for normalizing only by the magnitude factor of Equation 5 and not by the phase factor of Equation 6. In some embodiments, the normalization given in Equations 5-7 is carried out in addition to the normalization given in Equations 3 and 4, as a second normalization stage, e.g., after the timing compensation stage described herein.

Next, the processors proceeds to a timing compensation step 212. As noted above, a timing error in determining the OFDM symbol boundaries introduces a residual linear phase error proportional to the offset between the estimated and true symbol-boundary times. Let $x_k$, $k=0 \ldots N-1$, denote the index of the $k^{th}$ data sub-carrier in $D_{SC}$. The phase component of the CSI coefficient $\tilde{h}_{x_k}^{Rx,SS}$ is denoted $\varphi_{x_k}$ and is modeled as:

$$\varphi_{x_k} = \alpha_{x_k} + A \cdot x_k + B \quad \text{Equation 8:}$$

wherein $\alpha_{x_k}$ denotes the phase component of the coefficient $\tilde{h}_{x_k}^{Rx,SS}$ assuming ideal timing estimation for the symbol boundaries, 'A' is a slope resulting from timing estimation error and 'B' is a constant in the linear equation. Both 'A' and 'B' are common to all of the coefficient-vectors (Rx,SS).

It can be shown that by using Minimum Mean Square Error Estimation (MMSE) techniques, the estimated slope in Equation 8 is given by the expression:

$$\hat{A} = \frac{\sum_{x_k, x_{k+1} \in D_{SC}} (x_{k+1} - x_k) \cdot (\alpha_{x_k} - \alpha_{x_{k+1}})}{\sum_{x_k, x_{k+1} \in D_{SC}} (x_{k+1} - x_k)^2} \quad \text{Equation 9}$$

In some embodiments, the processor estimates a separate slope A'(Rx,SS) for each (Rx,SS) pair, using the expression in Equation 9. The processor then calculates the final estimation for slope A in Equation 8 by averaging the resulting A'(Rx,SS) over the (Rx,SS) pairs as given by:

$$\hat{A}_{MMSE} = \frac{1}{N_{RX} \cdot N_{SS}} \sum_{Rx=0}^{N_{Rx}-1} \sum_{SS=0}^{N_{SS}-1} A'(Rx, SS) \quad \text{Equation 10}$$

The processor then removes from the residual linear phase error from the CSI coefficients as given by:

$$\bar{h}_n^{Rx,SS} = \tilde{h}_n^{Rx,SS} \cdot \exp\left[-j \cdot \hat{A}_{MMSE} \cdot \left(n - \frac{N_{SC}}{2}\right)\right] \quad \text{Equation 11}$$

In some embodiments, the CSD scheme applied is unknown to the receiver, and the processor therefore skips the CSD removal operation of Equation 1. The uncompensated CSD causes a residual linear phase error in addition to the phase error caused by the symbol timing offset. In such embodiments, the processor estimates a separate slope A'(Rx,SS) for each (Rx,SS) pair as described above, and removes the residual linear phase error for each coefficient-vector separately, using the respective estimated A'(Rx,SS) as given by:

$$\bar{h}_n^{Rx,SS} = \tilde{h}_n^{Rx,SS} \cdot \exp\left[-j \cdot A'(Rx, SS) \cdot \left(n - \frac{N_{SC}}{2}\right)\right] \quad \text{Equation 12}$$

By using Equation 12, the residual linear phase errors contributed by both the uncompensated CSD and the symbol timing error are removed.

Following step 212 the CSI is normalized and can be used for generating a secret key, and the method terminates.

Post Normalization Processing with Data Exchange

In the embodiments describe above, each of the wireless devices independently normalizes its local CSI replica. The independent normalization requires no data exchange between the devices, but nevertheless results in normalized CSIs suitable for generating matching secret keys.

In some practical situations, after applying the normalization, the difference between the normalized CSIs remains significant in one or more coefficient-vectors, which may result in non-matching secret keys. In general, the magnitude part of the normalized CSI coefficients tends to be more robust for secret key generation than the phase part. In the description that follows we describe a method in which the wireless devices exchange data, without compromising the keys secrecy, to identify non-matching normalized CSIs, and exclude certain coefficients from generating the secret key. Alternatively or additionally, the processor may apply additional post processing normalization. The methods below are described as being executed by processor 52 of wireless devices DEV_A and DEV_B.

In one embodiment, to identify non-matching normalized CSIs, the processor calculates an average phase $NF_P(Rx,SS)$ for each (Rx,SS) pair as given, for example, in Equation 6 above, and reports the average phases to the other wireless device. The processor in each wireless device then compares between the average phases calculated from its normalized CSI and the respective average phases reported by the other device. In an embodiment, the processor detects a non-matching coefficient-vector, corresponding to a (Rx,SS) pair), by identifying that the difference between the respective average phases exceeds a predefined threshold value.

In some embodiments, the processor excludes the identified non-matching coefficient-vectors from generating the secret keys.

In some embodiments, for the normalization stage given in Equations 5-7, the processors in each of the wireless devices calculate the phase factors by selecting a range or window of the sub-carriers. The optimal window search can be carried out based on the non-normalized CSIs, or on versions of the CSIs normalized only by a magnitude normalization factors as given in Equation 5.

The device calculates for each (Rx,SS) pair a phase-difference vector:

$$d\varphi_{sc}^{Rx,SS} = \max(\emptyset_{sc}^{Rx,SS}) - \min(\emptyset_{sc}^{Rx,SS}) \quad \text{Equation 13:}$$

wherein $\emptyset_{sc}^{Rx,SS}$ is a vector of phases of the magnitude-normalized CSI coefficients within a sub-carrier window W about the center sub-carrier sc as given by:

$$\emptyset_{sc}^{Rx,SS} = \{\varphi_{sc-W/2}^{Rx,SS} \ldots \varphi_{sc+W/2}^{Rx,SS}\} \quad \text{Equation 14:}$$

The processors in the wireless devices can use a predefined window W of any suitable size such as, for example, 10 sub-carriers for a 80 MHz bandwidth configuration. The wireless devices exchange the phase information $d\varphi_{sc}^{Rx,SS}$ given in Equation 13, and search for an optimal window location, i.e., a range of sub-carriers $sc-W/2 \ldots sc+W/2$ over which to calculate an average phase of the CSI coefficients. Note that after exchanging the phase information both wireless devices have knowledge of:

$$\emptyset_{DEV\_A}^{Rx,SS} = \{d\varphi_{W/2}^{Rx,SS} \ldots d\varphi_{N_{sc}-1-W/2}^{Rx,SS}\}$$

$$\emptyset_{DEV\_B}^{Rx,SS} = \{d\varphi_{W/2}^{SS,Rx} \ldots d\varphi_{N_{sc}-1-W/2}^{SS,Rx}\}$$

Let and $\sigma_{DEV\_A}^{Rx,SS}$ $\sigma_{DEV\_B}^{SS,Rx}$ be ordered vectors of indices given by:

$$\sigma_{DEV\_A}^{Rx,SS} = \{\sigma_0^{DEV\_A} \ldots \sigma_{N1-1}^{DEV\_A}\}$$

$$\sigma_{DEV\_B}^{SS,Rx} = \{\sigma_0^{DEV\_B} \ldots \sigma_{N2-1}^{DEV\_B}\} \quad \text{Equation 16:}$$

Wherein $\sigma_{n1}^{DEV\_A}$ and $\sigma_{n2}^{DEV\_B}$ satisfy:

$$d\varphi_{\sigma_{n1}^{DEV\_A}}^{Rx,SS} < T_\varphi, 0 \le n1 < N1 \quad \text{Equation 17}$$

$$d\varphi_{\sigma_{n2}^{DEV\_B}}^{Rx,SS} < T_\varphi, 0 \le n2 < N2$$

and $T_\varphi$ is a predefined phase threshold.

The processors define an index for the sub-carrier window center as:

$$\sigma_{A,B}^{Rx,SS} = \min(\sigma_{DEV\_A}^{Rx,SS} \cap \sigma_{DEV\_B}^{SS,Rx}) \quad \text{Equation 18:}$$

The normalization phase factor is given for DEV_A by:

$$NF_P^{DEV\_A}(Rx, SS) = \frac{1}{W} \sum_{n=\sigma_{A,B}^{Rx,SS}-W/2}^{\sigma_{A,B}^{Rx,SS}+W/2} \varphi_n^{Rx,SS}$$

and for DEV_B by:

$$NF_P^{DEV\_B}(Rx, SS) = \frac{1}{W} \sum_{n=\sigma_{A,B}^{SS,Rx}-W/2}^{\sigma_{A,B}^{SS,Rx}+W/2} \varphi_n^{Rx,SS} \quad \text{Equation 19}$$

The processors of DEV_A and DEV_B can then perform the normalization given in Equation 7 above, using the phase normalization factors of Equations 18 and 19, respectively, and magnitude normalization factors as given by Equation 5. Alternatively, Equation 5 may be calculated over the same sub-carrier window used for calculating the phase normalization factors.

The embodiments described above are given by way of example, and other suitable embodiments can also be used.

For example, although in the embodiments described above the SKG exchange mainly refers to exchanging sounding frames, in alternative embodiments, frames of any suitable type such as data frames can also be used instead of or in addition to the sounding frames.

Although the embodiments described above refer mainly to Multiple-Input Multiple-Output (MIMO) wireless devices comprising multiple antennas, at least some of the embodiments are applicable, mutatis mutandis, also to Single-Input Single-Output (SISO) devices.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A wireless device, comprising:
a modem, configured to modulate signals for transmission over wireless channels, and to demodulate signals received over the wireless channels; and
processing circuitry, configured to:
receive a first frame from a second wireless device over a wireless channel via the modem, and transmit a second frame to the second wireless device via the modem and over the wireless channel;
calculate a first Channel State Information (CSI), based on the received first frame, by calculating multiple coefficient-vectors that each (i) corresponds to a respective pair of a receive antenna and a spatial stream, and (ii) comprises multiple coefficients corresponding to multiple respective sub-carriers;
calculate a first normalized CSI by applying to the first CSI a normalization procedure that normalizes separately each of the coefficient-vectors, and generate, based on the first normalized CSI, a first key that due to the normalization procedure has an increased likelihood to match a second key generated in the second wireless device based on the second frame; and
communicate securely with the second wireless device over the wireless channel using the first key.

2. The wireless device according to claim 1, wherein the processing circuitry is configured to apply the normalization procedure for reducing ambiguity in estimating the first CSI due to at least one of: (i) phase differences that exist between antennas of the wireless device, (ii) gain setting in reception paths of the antennas, and (iii) timing offset in estimating boundaries of received symbols.

3. The wireless device according to claim 1, wherein the processing circuitry is configured to apply the normalization procedure to the first CSI, independently from an application of the normalization procedure to a second CSI generated in the second wireless device based on the second frame, wherein applying the normalization procedure reduces a difference between the first and second CSIs.

4. The wireless device according to claim 1, wherein the processing circuitry is configured to normalize a given coefficient-vector by dividing the given coefficient-vector by a respective average value calculated over selected coefficients of the given coefficient-vector.

5. The wireless device according to claim 1, wherein the processing circuitry is configured to estimate, for one or more coefficient-vectors, a phase slope of a residual linear phase error across multiple sub-carriers, and to apply to the one or more coefficient-vectors linear phase compensation based on the estimated phase slope.

6. The wireless device according to claim 1, wherein the processing circuitry is configured to exchange with the second wireless device average phase values calculated over coefficient-vectors of the first CSI and a second CSI generated by the second wireless device, to identify, based on the average phase values, that a difference in a given coefficient-vector between the first CSI and the second CSI exceeds a predefined difference threshold, and to exclude at least part of the given coefficient-vector from generating the first key.

7. The wireless device according to claim 1, wherein the processing circuitry is configured to exchange with the second wireless device differential phase values related to coefficient-vectors of the first CSI and a second CSI generated by the second wireless device, to select, based on the exchanged differential phase values, multiple sub-carriers over which to calculate respective phase-normalization factors for the coefficient-vectors, and to normalize the coefficient-vectors of the first CSI using the respective phase-normalization factors.

8. The wireless device according to claim 1, wherein the processing circuitry is configured to transmit the second frame within a TX Opportunity (TXOP) during which the first frame was transmitted.

9. The wireless device according to claim 1, wherein the processing circuitry is configured to initiate frame exchange by transmitting the second frame to the second wireless device and then receiving the first frame from the second wireless device, including transmitting the second frame only in response to validating that no CSI was sent over the wireless channel for at least a predefined time period longer than a coherency time of the wireless channel.

10. The wireless device according to claim 1, wherein the processing circuitry is configured to predefine a time period longer than a coherency time of the wireless channel, and to inhibit sending any CSI to the second wireless device for at least the predefined time period after receiving the first frame and after transmitting the second frame.

11. The wireless device according to claim 1, wherein the processing circuitry is configured to assign a same set of antennas of the wireless device for receiving the first frame and for transmitting the second frame.

12. A method, comprising:
in a first wireless device, receiving a first frame from a second wireless device over a wireless channel, and transmitting a second frame to the second wireless device over the wireless channel;
calculating in the first wireless device a first Channel State Information (CSI), based on the received first frame, by calculating multiple coefficient-vectors that each (i) corresponds to a respective pair of a receive antenna and a spatial stream, and (ii) comprises multiple coefficients corresponding to multiple respective sub-carriers;
calculating in the first wireless device a first normalized CSI by applying to the first CSI a normalization procedure that normalizes separately each of the coefficient-vectors, and generating based on the first normalized CSI, a first key that due to the normalization procedure has an increased likelihood to match a second key generated in the second wireless device based on the second frame; and communicating securely with the second wireless device over the wireless channel using the first key.

13. The method according to claim 12, wherein applying the normalization procedure comprises applying the normalization procedure for reducing ambiguity in estimating the first CSI due to at least one of: (i) phase differences that exist between antennas of the wireless device, (ii) gain setting in reception paths of the antennas, and (iii) timing offset in estimating boundaries of received symbols.

14. The method according to claim 12, wherein calculating the first normalized CSI comprises applying the normalization procedure to the first CSI, independently from an application of the normalization procedure to a second CSI generated in the second wireless device based on the second frame, wherein applying the normalization procedure reduces a difference between the first and second CSIs.

15. The method according to claim 12, wherein applying the normalization procedure comprises normalizing a given coefficient-vector by dividing the given coefficient-vector by a respective average value calculated over selected coefficients of the given coefficient-vector.

16. The method according to claim 12, wherein applying the normalization procedure comprises estimating, for one or more coefficient-vectors, a phase slope of a residual linear phase error across multiple sub-carriers, and applying to the one or more coefficient-vectors linear phase compensation based on the estimated phase slope.

17. The method according to claim 12, and comprising exchanging with the second wireless device average phase values calculated over coefficient-vectors of the first CSI and a second CSI generated by the second wireless device, identifying based on the average phase values that a difference in a given coefficient-vector between the first CSI and the second CSI exceeds a predefined difference threshold, and excluding at least part of the given coefficient-vector from generating the first key.

18. The method according to claim 12, and comprising exchanging with the second wireless device differential phase values related to coefficient-vectors of the first CSI and a second CSI generated by the second wireless device, wherein applying the normalization procedure comprises selecting, based on the exchanged differential phase values, multiple sub-carriers over which to calculate respective phase-normalization factors for the coefficient-vectors, and normalizing the coefficient-vectors of the first CSI using the respective phase-normalization factors.

19. The method according to claim 12, wherein transmitting the second frame comprises transmitting the second sounding frame within a TX Opportunity (TXOP) during which the first frame was transmitted.

20. The method according to claim 12, and comprising initiating frame exchange by transmitting the second frame to the second wireless device and then receiving the first frame from the second wireless device, wherein transmitting the second frame comprises transmitting the second frame only in response to validating that no CSI was sent over the wireless channel for at least a predefined time period longer than a coherency time of the wireless channel.

21. The method according to claim 12, wherein and comprising predefining a time period longer than a coherency time of the wireless channel, and inhibiting sending any CSI to the second wireless device for at least the predefined time period after receiving the first frame and after transmitting the second frame.

22. The method according to claim 12, wherein receiving the first frame and transmitting the second frame comprises assigning a same set of antennas of the wireless device for receiving the first frame and for transmitting the second frame.

* * * * *